(12) United States Patent
Byrne et al.

(10) Patent No.: US 11,702,145 B2
(45) Date of Patent: Jul. 18, 2023

(54) VEHICLE BODY STRUCTURE

(71) Applicant: Nissan North America, Inc., Franklin, TN (US)

(72) Inventors: Gregory Byrne, Novi, MI (US); Jeffrey Pencak, Cass City, MI (US); Seth Grant, Phoenix, AZ (US); Brian Salazar, Chandler, AZ (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 78 days.

(21) Appl. No.: 17/364,810

(22) Filed: Jun. 30, 2021

(65) Prior Publication Data

US 2023/0001989 A1    Jan. 5, 2023

(51) Int. Cl.
*B62D 33/02* (2006.01)
*B62D 33/06* (2006.01)
*B60R 13/04* (2006.01)
*B62D 27/04* (2006.01)

(52) U.S. Cl.
CPC .............. *B62D 27/04* (2013.01); *B60R 13/04* (2013.01); *B62D 33/02* (2013.01); *B62D 33/06* (2013.01); *B62D 33/0604* (2013.01)

(58) Field of Classification Search
CPC ...... B62D 33/02; B62D 33/023; B62D 33/06; B62D 33/0604; B62D 27/04; B60R 13/04; B60R 13/06; B60R 13/07; B60R 13/08; B60R 13/0815
See application file for complete search history.

(56) References Cited

U.S. PATENT DOCUMENTS

| | | | | |
|---|---|---|---|---|
| 4,222,605 A * | 9/1980 | Engelhard | .............. | B62D 27/06 52/393 |
| 5,090,765 A * | 2/1992 | Gremillion | ................ | B60J 1/20 296/180.1 |
| 5,280,984 A * | 1/1994 | Paul | ..................... | B62D 47/025 296/190.02 |
| 5,516,185 A * | 5/1996 | O'Donnell | ................ | B60P 3/36 277/645 |
| 5,924,762 A * | 7/1999 | Pols | ......................... | B60P 3/36 49/477.1 |
| 8,052,019 B2 * | 11/2011 | Plavetich | .............. | B60P 7/0815 224/543 |
| 10,093,150 B2 * | 10/2018 | Waldner | .................... | B60H 1/26 |
| 11,279,421 B1 * | 3/2022 | Hoogendoorn | ........... | B60R 9/06 |
| 11,492,052 B2 * | 11/2022 | Holmstrom | ........ | B62D 33/0604 |

(Continued)

*Primary Examiner* — Gregory A Blankenship
(74) *Attorney, Agent, or Firm* — Global IP Counselors, LLP (57) ABSTRACT

A vehicle body structure has a vehicle frame structure, a cabin structure, a cargo area structure and an elastic bumper element. The cabin structure is installed to a forward portion of the vehicle frame structure and defines a passenger compartment. The cabin structure also has a rearward wall. The cargo area structure is installed to a rearward portion of the vehicle frame structure. The cargo area structure has a forward wall spaced apart from the rearward wall of the cabin structure. The elastic bumper element is installed to one of the rearward wall or the forward wall such that in response to flexing of the vehicle frame structure, the elastic bumper element can contact the other of the rearward wall or the forward wall thereby restricting direct contact between the rearward wall and the forward wall.

12 Claims, 10 Drawing Sheets

(56) References Cited

U.S. PATENT DOCUMENTS

| | | | | |
|---|---|---|---|---|
| 2015/0123428 A1* | 5/2015 | Hwang | ............... | E02F 9/163 296/190.03 |
| 2020/0070743 A1* | 3/2020 | Williams | ............... | F16B 1/00 |
| 2020/0324832 A1* | 10/2020 | Higgins | ............ | B62D 33/02 |

* cited by examiner

VEHICLE BODY STRUCTURE

BACKGROUND

Technical Field

The present disclosure generally relates to a vehicle body structure. More specifically, the present disclosure relates to that includes at least one elastic bumper element installed to one of a rearward wall of a cabin structure or a forward wall of a cargo area structure that cushions contact between the cabin structure and the cargo area structure in response to flexing of a frame structure that is attached to and supports both the cabin structure and the cargo area structure.

Background Information

The frame structures of vehicles, such as pickup trucks, are prone to flexing in response to heavy loads in the cargo area structure and rough road surfaces. In some instances the frame structure can flex sufficiently causing contact between a rearward wall of the cabin structure and the cargo area structure of the vehicle.

SUMMARY

One object of the present disclosure is to provide a vehicle body structure with cushioning elements or bumper elements between a cabin structure and a cargo area structure of a vehicle in order to limit or eliminate contact therebetween in response to flexing of a frame structure of the vehicle body structure.

In view of the state of the known technology, one aspect of the present disclosure is to provide a vehicle body structure with a vehicle frame structure, a cabin structure, a cargo area structure and an elastic bumper element. The cabin structure is installed to a forward portion of the vehicle frame structure and defines a passenger compartment. The cabin structure also has a rearward wall. The cargo area structure is installed to a rearward portion of the vehicle frame structure. The cargo area structure has a forward wall spaced apart from the rearward wall of the cabin structure. The elastic bumper element is installed to one of the rearward wall or the forward wall such that in response to flexing of the vehicle frame structure, the elastic bumper element can contact the other of the rearward wall or the forward wall thereby restricting direct contact between the rearward wall and the forward wall.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
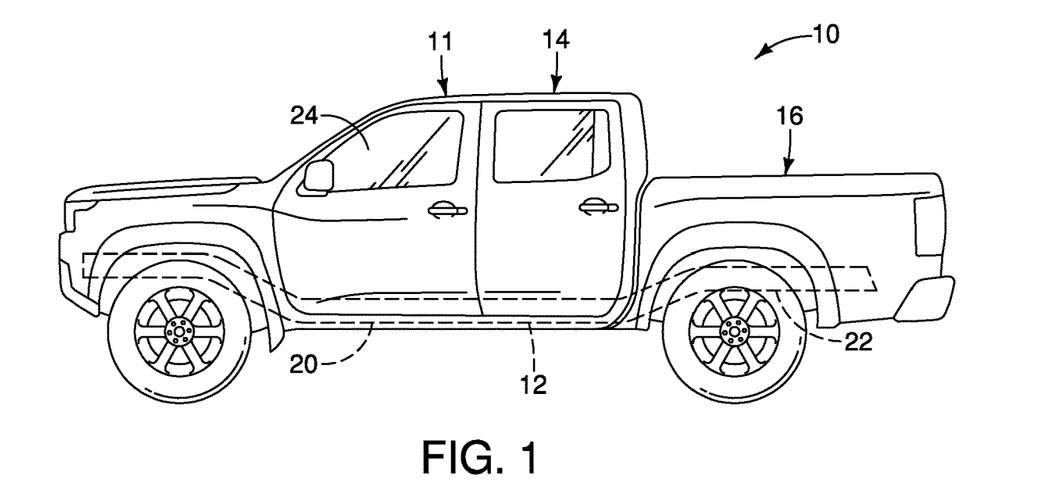
FIG. 1 is a side view of a vehicle with a vehicle body structure that includes a frame structure that supports a cabin structure and a cargo area structure in accordance with a first embodiment.

Referring initially to FIG. 1, a vehicle 10 having a vehicle body structure 11 that includes a vehicle frame structure 12, a cabin structure 14 and a cargo area structure 16 is illustrated in accordance with a first embodiment.

The frame 12 extends beneath the cabin structure 14 and the cargo area structure 16. More specifically, the vehicle frame structure 12 has a forward portion 20 and a rearward portion 22. The cabin structure 14 is installed to the forward portion 20 and the cargo area structure 16 is installed to the rearward portion 22.

Figure 2:
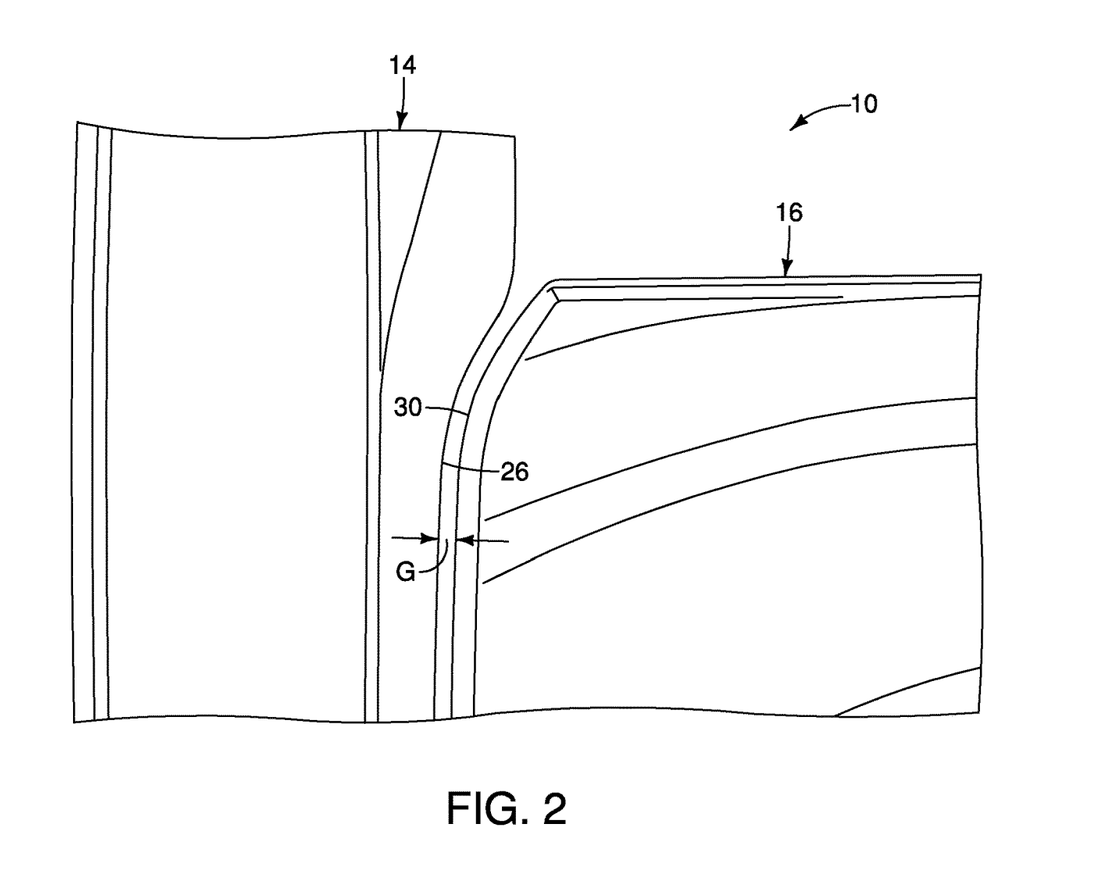
FIG. 2 is a side view of a central area of the vehicle body structure showing a rearward wall of the cabin structure spaced apart from a forward wall of the cargo area structure in accordance with the first embodiment.
Figure 3:
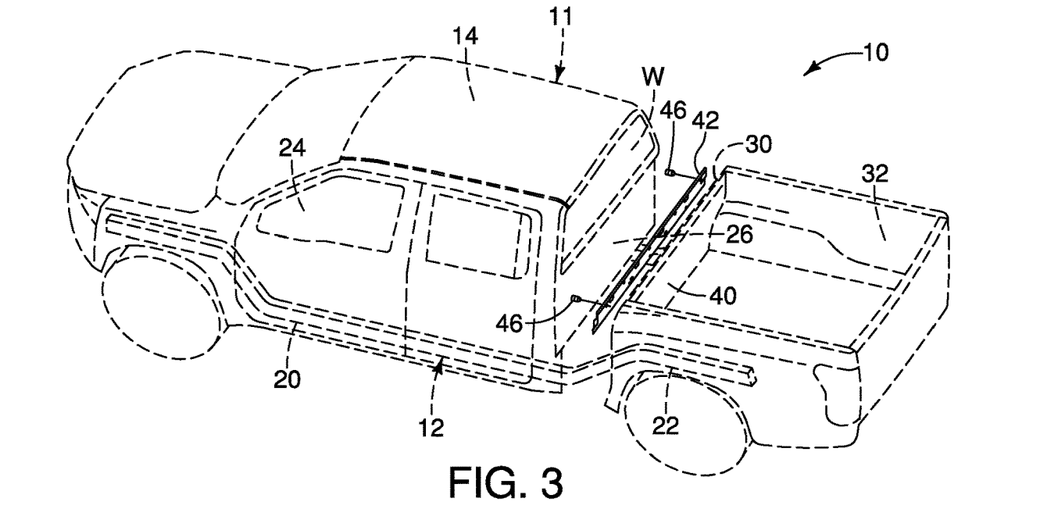
FIG. 3 is a perspective exploded view of the vehicle showing a portion of the vehicle frame structure, the cabin structure, the cargo area structure and a pair of elastic bumper elements in accordance with the first embodiment.
Figure 4:
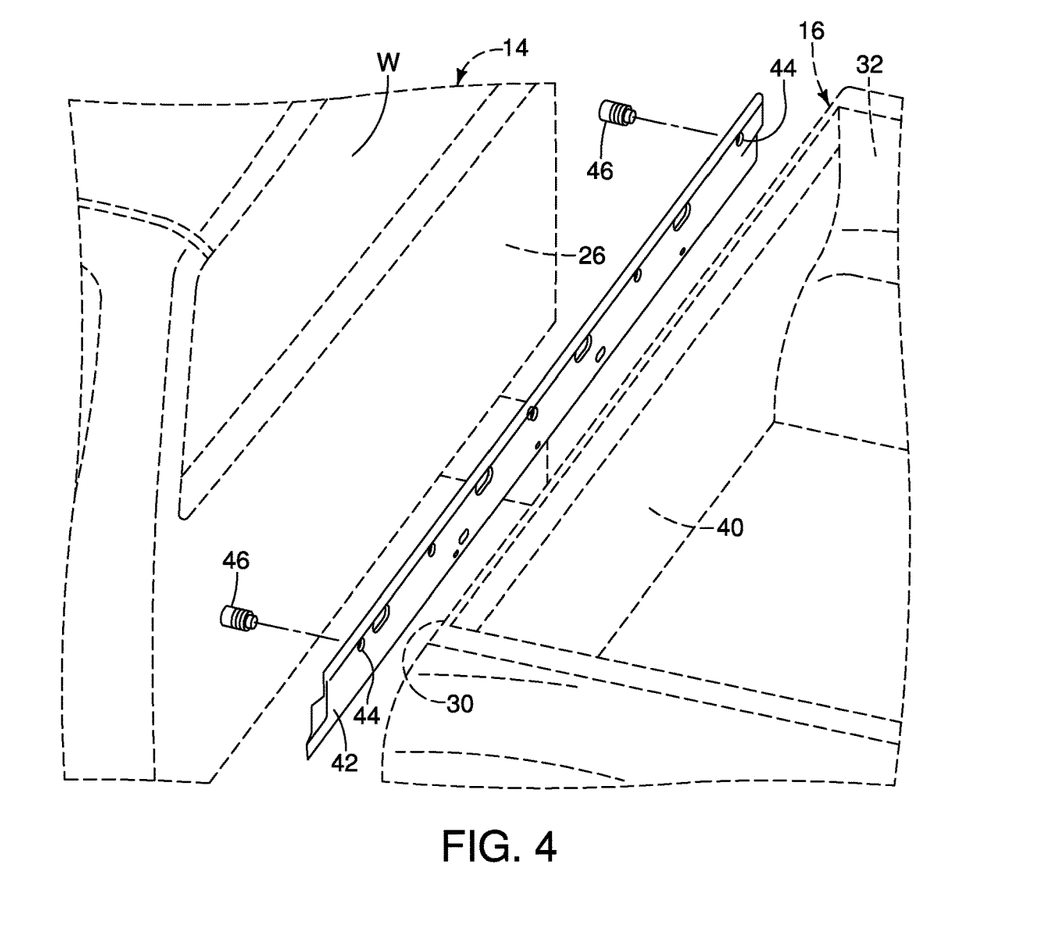
FIG. 4 is a further perspective exploded view of a central portion of the vehicle showing a portion of the cabin structure, the cargo area structure, a header panel of the cargo area structure and the pair of elastic bumper elements in accordance with the first embodiment.
Figure 11:
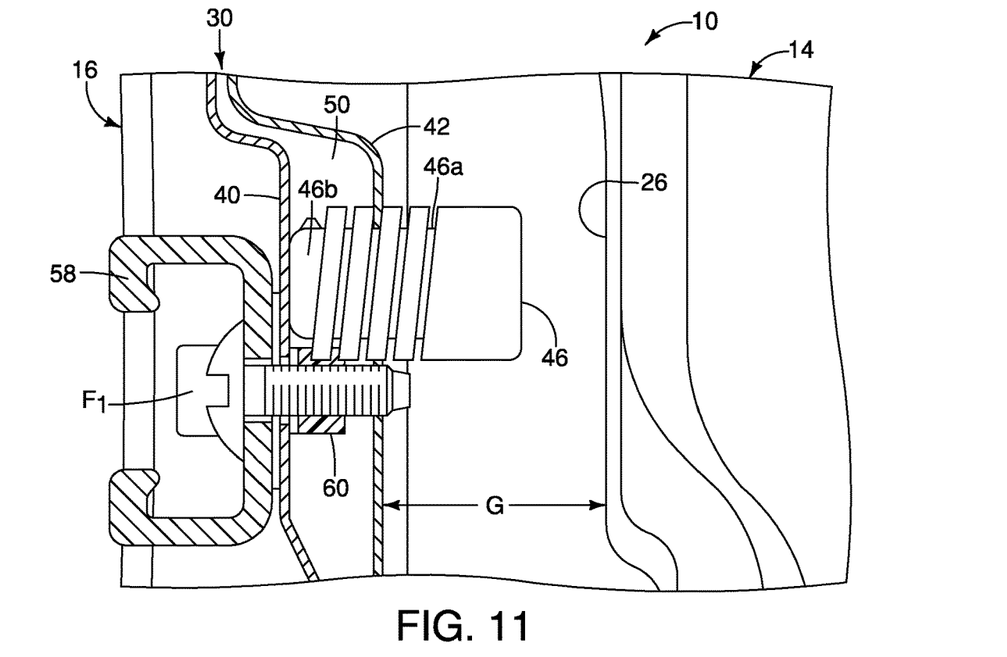
FIG. 11 is a side cross-sectional view of the rearward wall of the cabin structure and the forward wall of the cargo area structure showing the bumper element attached to the forward wall of the cargo area structure in accordance with the first embodiment.

The cabin structure 14 defines a passenger compartment 24 and has a rearward wall 26. The cargo area structure 16 and has a forward wall 30 and a cargo area 32 rearward of the forward wall 30. The rearward wall 26 of the cabin structure 14 and the forward wall 30 of the cargo area structure 16 face one another but are spaced apart from one another by a gap G, as shown in FIGS. 2 and 11. The gap G does not have a fixed value but can be larger in some areas between the rearward wall 26 and the forward wall 30 smaller in other areas between the rearward wall 26 and the forward wall 30.

As shown in FIGS. 3-6, the forward wall 30 of the cargo area structure 16 includes at least a main panel 40 and a header panel 42 that is attached to and extends along an upper area of the main panel 40 of the forward wall 30. As shown in FIGS. 4, 6, and 8-10, the header panel 42 includes a pair of threaded openings 44 proximate opposite lateral ends/sides thereof. Each of the pair of threaded openings 44 is dimensioned to receive and retain corresponding ones of two spaced apart bumper elements 46.

Figure 5:
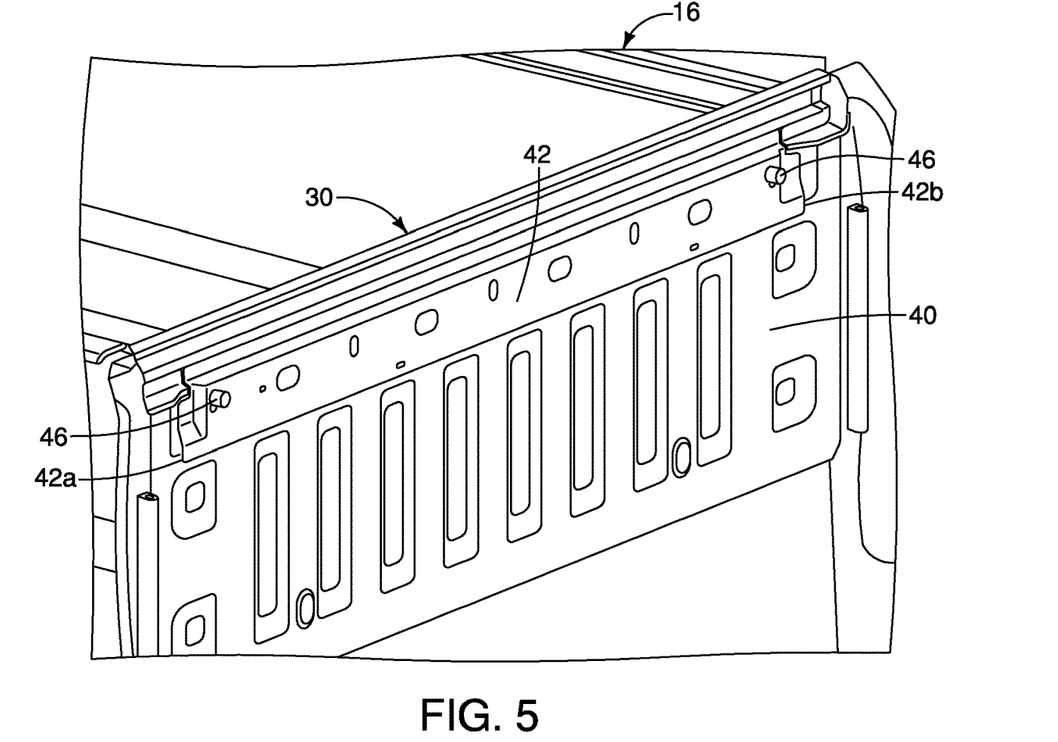
FIG. 5 is a perspective view of the forward wall of the cargo area structure showing the bumper elements attached thereto in accordance with the first embodiment.
Figure 6:
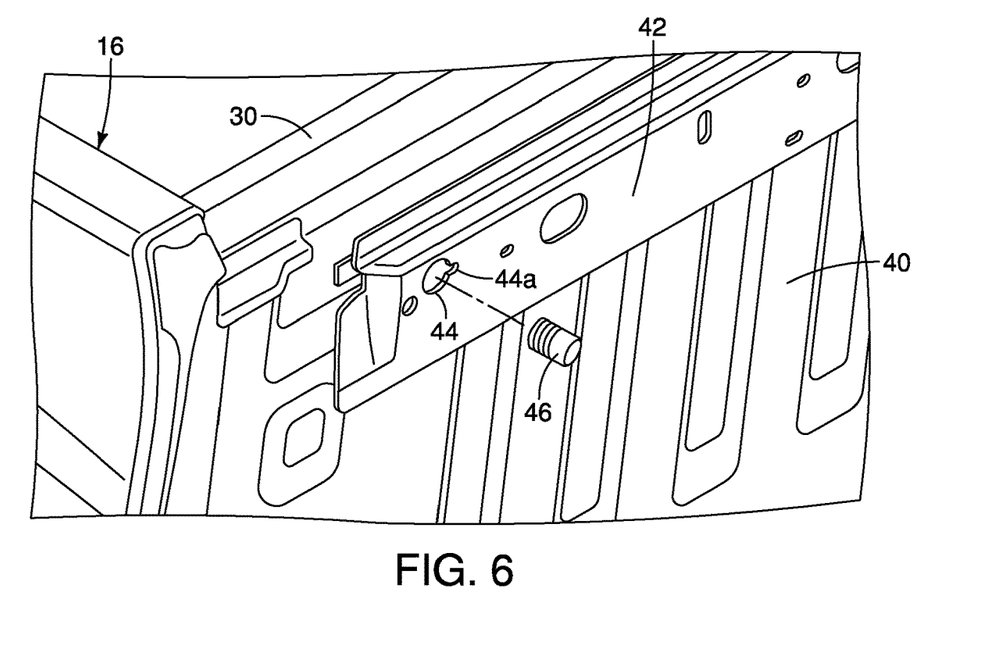
FIG. 6 is an exploded perspective view of the forward wall of the cargo area structure showing the header panel and the bumper elements in accordance with the first embodiment.
Figure 7:
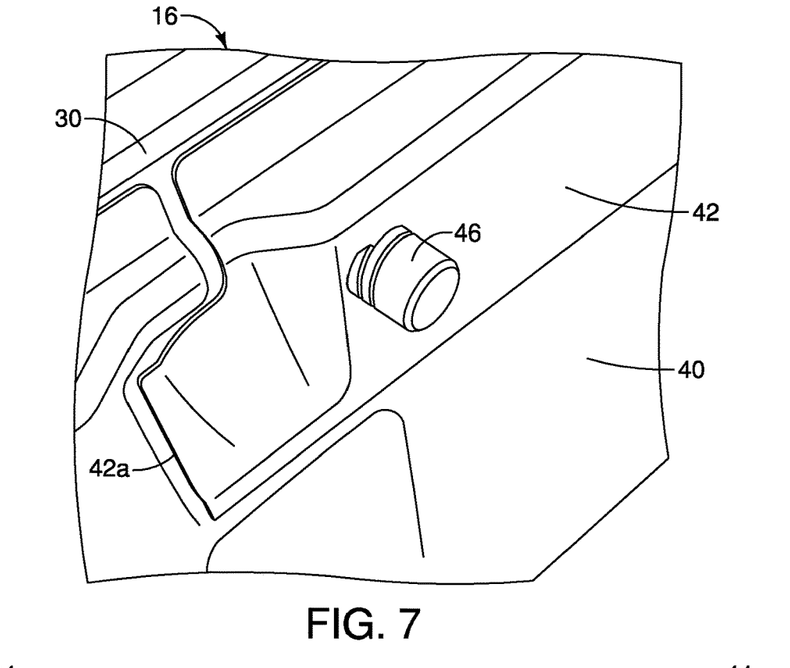
FIG. 7 is a perspective view of one end of the forward wall and the header panel of the cargo area structure showing one of the bumper elements attached thereto in accordance with the first embodiment.
Figure 8:
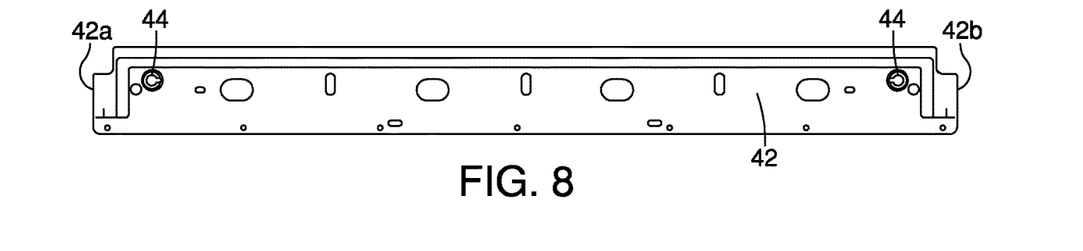
FIG. 8 is a front view of the header panel and opening dimensioned to receive the bumper elements in accordance with the first embodiment.

The header panel 42 is welded directly to the main panel 40 of the forward wall 30 adjacent to an upper edge of the forward wall 30, as shown in FIGS. 5-7. The elastic bumper elements 46 are installed to corresponding ones of the openings 44 of the header panel 42 of the forward wall 30 such that in response to flexing of the vehicle frame structure 12, the elastic bumper elements 46 can contact the rearward wall 26 of the cabin structure 14 thereby restricting or preventing direct contact between the rearward wall 26 and the forward wall 30. The openings 44 are located at opposing ends of the header panel 42 and hence, the elastic bumper elements 46 are spaced apart from one another and are installed proximate opposite upper ends 42a and 42b of the header panel 42 and hence of the forward wall 30 of the cargo area structure 16.

Figure 12:
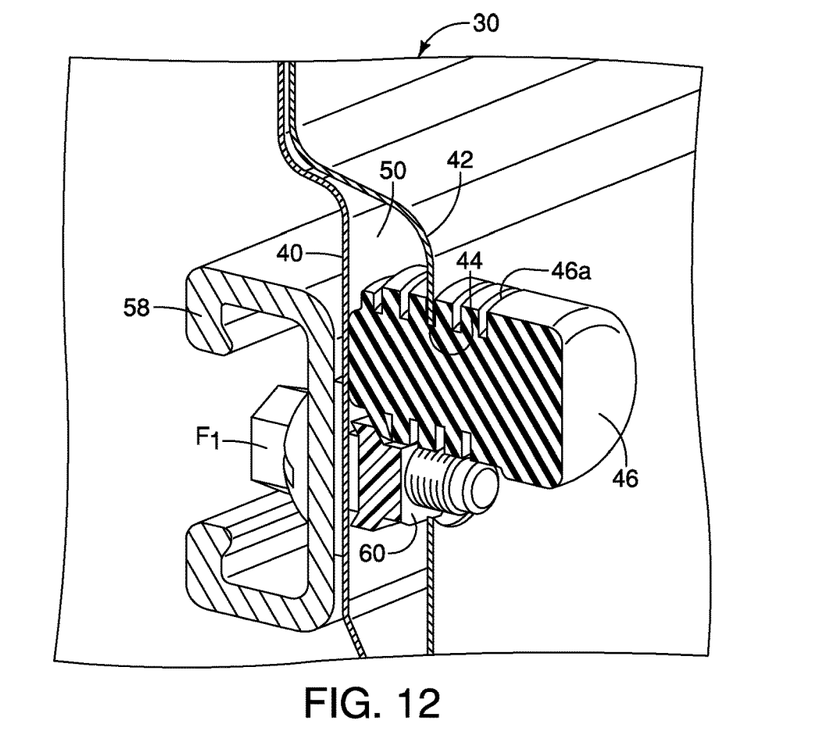
FIG. 12 is a perspective cross-sectional view of a portion of the forward wall of the cargo area structure showing the bumper element attached to the forward wall of the cargo area structure in accordance with the first embodiment.
Figure 13:
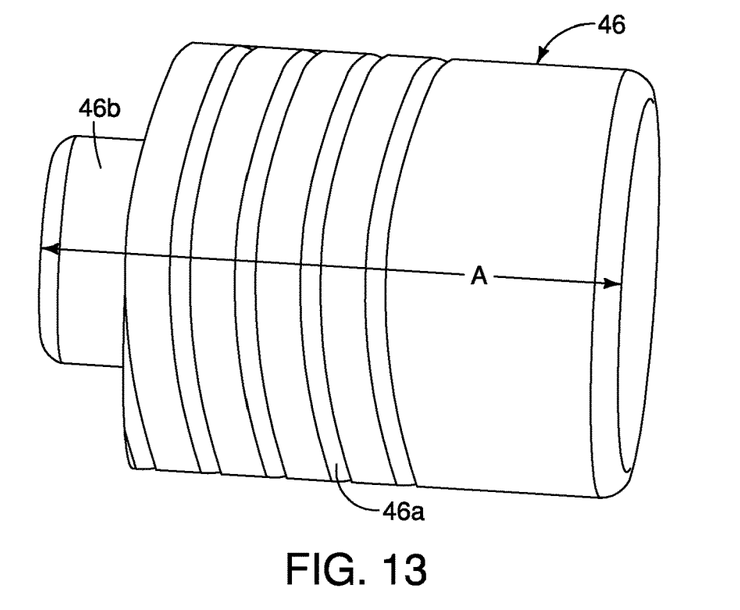
FIG. 13 is a side view of the bumper element removed from the vehicle in accordance with the first embodiment.
Figure 14:
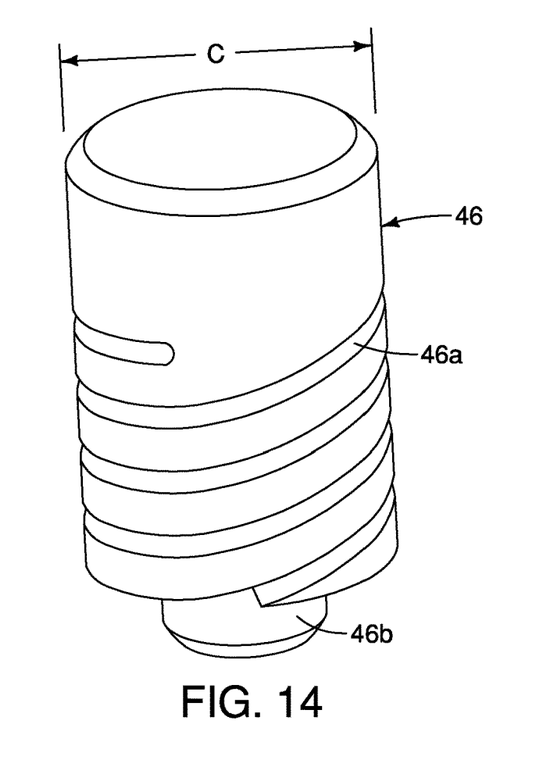
FIG. 14 is a perspective view of the bumper element removed from the vehicle in accordance with the first embodiment.

The elastic bumper elements 46 are cylindrically shaped, as shown in FIGS. 11-14. In the first embodiment, the elastic bumper elements 46 are made of a stiff rubber or polymer material that is compressible and has sufficient elasticity such that it can absorb impact energy and return to its original shape. As shown in FIGS. 13 and 14, the elastic bumper elements 46 are each formed with a spiral indentation 46a that are similar to mechanical fastener screw threads. The elastic bumper elements 46 can be partially inserted into one of the openings 44 then rotated drawing the elastic bumper elements 46 part way through the openings 44 and into a hollow area 50 between the main panel 40 and the header panel 42, as shown in FIGS. 11 and 12.

As shown in FIGS. 13 and 14, the bumper element 46 has a starter end 46b that fits into the opening 44 to assist in proper threading of the engagement of the spiral indentation 46a with the edge of the opening 44 that defines a corresponding thread that extends into the spiral indentation 46a during installation of the bumper element 46. The bumper element 46 has an overall outer diameter C, as shown in FIG. 14. The diameter of the starter end 46b is smaller diameter than the outer diameter C, which corresponds to the diameter of the opening 44.

Figure 9:
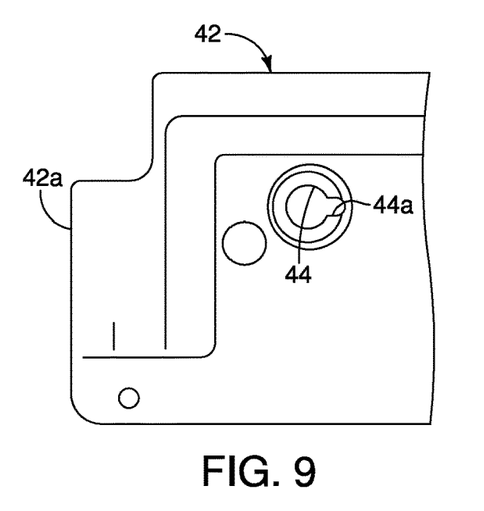
FIG. 9 is front view of a first end of the header panel showing the opening that receives the bumper elements in accordance with the first embodiment.
Figure 10:
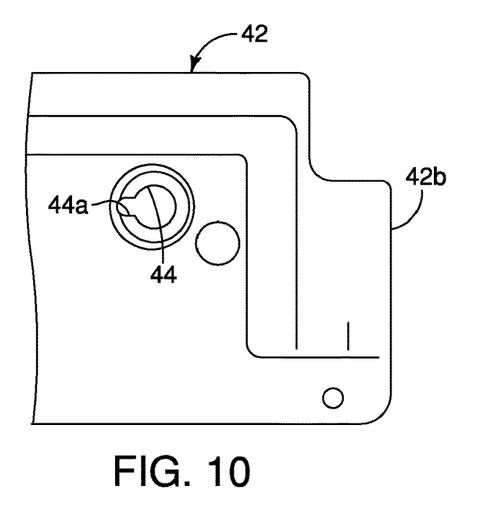
FIG. 10 is front view of a second end of the header panel and opening dimensioned to receive the bumper elements in accordance with the first embodiment.

As shown in FIGS. 9 and 10, the openings 44 each have a gap 44a with opposing sides of the gap 44a being offset from one another defining a mechanical thread of the opening 44 that fits into the corresponding spiral indentation 46a of the bumper element 46.

As shown in FIGS. 11 and 12, a rearward facing surface 52 of the forward wall 30 of the cargo area structure 16 includes a utility track 58 that is fixedly attached to the main panel 40 of the forward wall 30 of the cargo area structure 16. Fasteners $F_1$ extend through openings in the utility track 58 and through a nut 60 welded in position to the main wall 40 within the hollow area 50. The elastic bumper elements 46 are installed to the header panel 42 at locations adjacent to corresponding ones of the fasteners $F_1$ and the nut 60. The combination of the main panel 40 of the forward wall 30, the header panel 42 and the utility track 58 provides the forward wall 30 with rigidity and strength.

The utility track 58 is a well-known conventional component of cargo areas. Therefore, further description of the utility track 58 is omitted for the sake of brevity.

Depending upon driving conditions and the cargo load in the cargo area 32 of the cargo area structure 16, the frame structure 12 flexes. Consequently, there can be small amounts of movement of the cargo area structure 16 relative to the cabin structure 14. When such flexing occurs, it is possible for areas of the forward wall 30 to move into close proximity to the rearward wall 26. In instances of large amounts of flexing of the frame structure 12, it may be possible for the forward wall 30 to make contact with the rearward wall 26. In such extreme circumstance, the bumper elements 46 contact the rearward wall 26 of the cabin structure 14. The presence of the bumper elements 46 minimizes and in most cases, eliminates paint scratching and minimizes or prevents any damage to the rearward wall 26 due to flexing of the frame structure 12.

Second Embodiment

Figure 15:
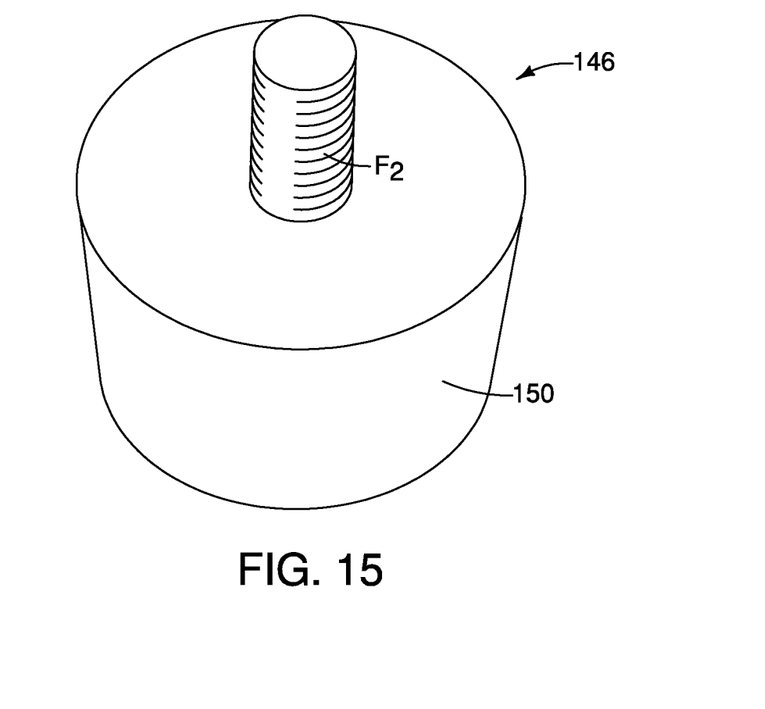
FIG. 15 is a first perspective view of a bumper element in accordance with a second embodiment.
Figure 16:
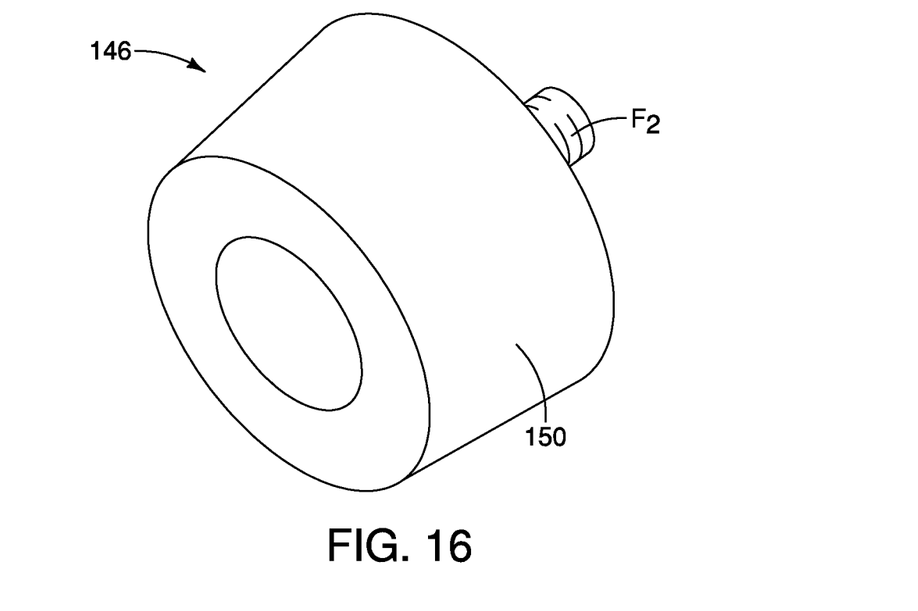
FIG. 16 is a second perspective view of the bumper element in accordance with the second embodiment.

Referring now to FIGS. 15 and 16, a bumper element 146 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiments, the cylindrically shaped bumper elements 46 are replaced with two of the bumper elements 146. Each of the bumper elements 146 has a threaded fastener portion $F_2$ and an elastic body 150. The elastic body 150 is molded around one end of the fastener portion $F_2$ and is fixedly attached thereto. The elastic body 150 has a tapered conical-like shape, as shown in FIGS. 15 and 16.

The threaded fastener portion $F_2$ is threaded into openings in the header panel of the forward wall of the cargo area structure 16.

Third Embodiment

Figure 17:
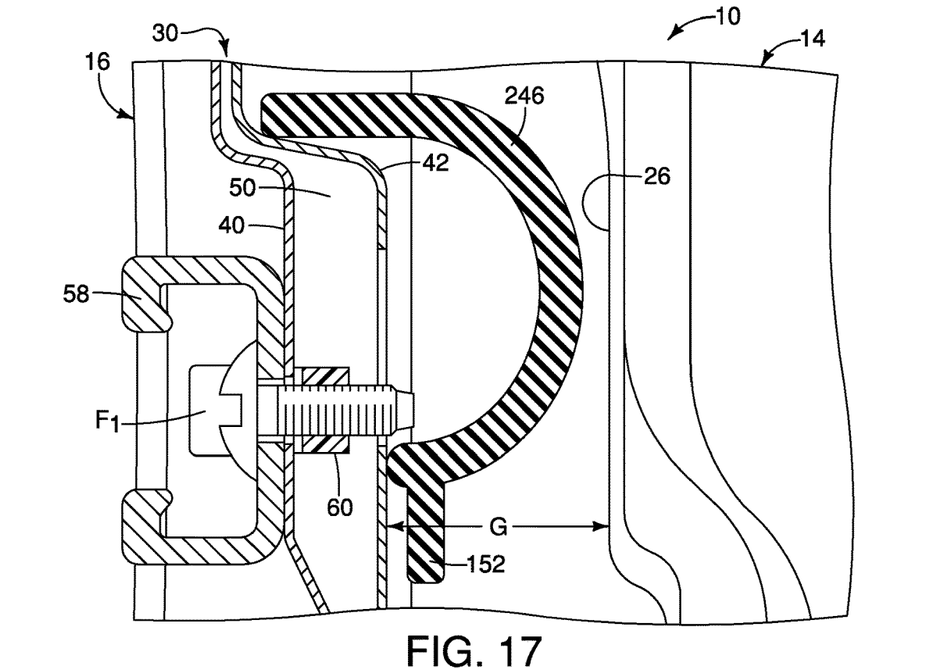
FIG. 17 is a side cross-sectional view of a bumper element in accordance with a third embodiment.
Figure 18:
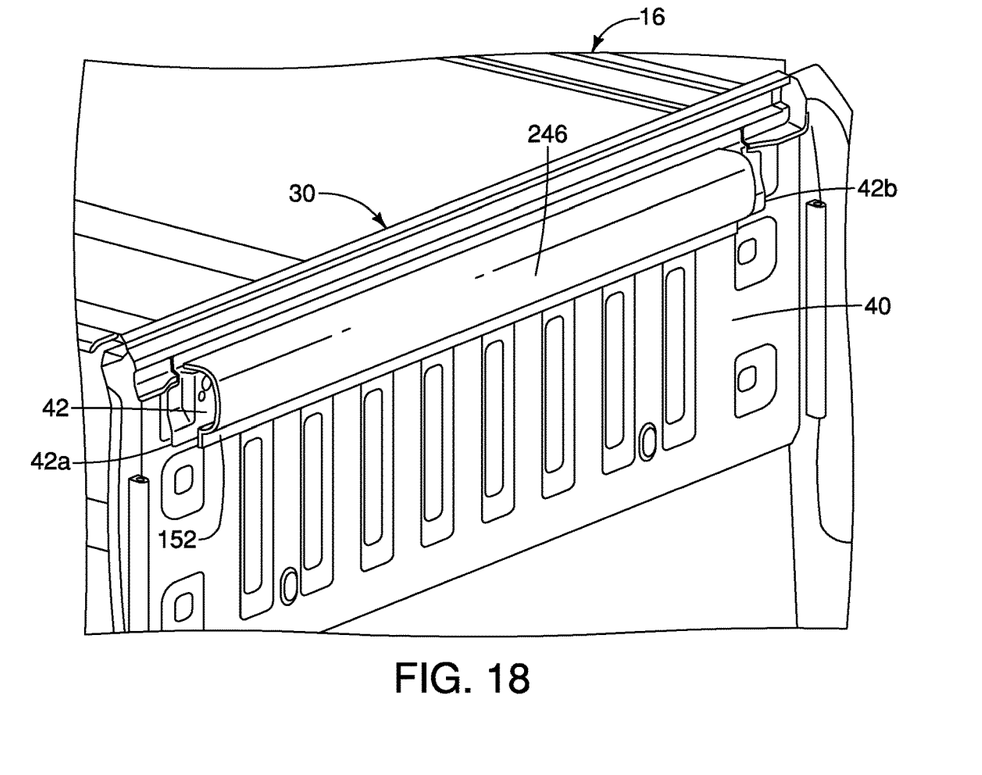
FIG. 18 is a perspective view of the forward wall of the cargo area structure showing the bumper element installed thereto in accordance with the third embodiment.

Referring now to FIGS. 17 and 18, a bumper element 246 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the bumper elements 46 are replaced with a single elongated bumper element 246 that is installed to the header panel 42. The bumper element 246 extends from the first end 42a to the second end 42b of the header panel 42. The bumper element 246 is a single elongated elastic element installed proximate an upper edge of the forward facing surface of the forward wall 30 of the cargo area structure 16.

The single elongated elastic element 246 includes a rearwardly extending lip that is attached to an upwardly facing surface of a recessed area of the forward facing wall 30. The single elongated elastic element 246 includes a downwardly extending lip 152 that is attached to the forward facing surface of the forward wall 30 of the cargo area structure 16. The single elongated elastic element 246 includes a forward facing surface having a curved or half cylindrical shape as viewed from a lateral side thereof in FIG. 17.

Fourth Embodiment

Figure 19:
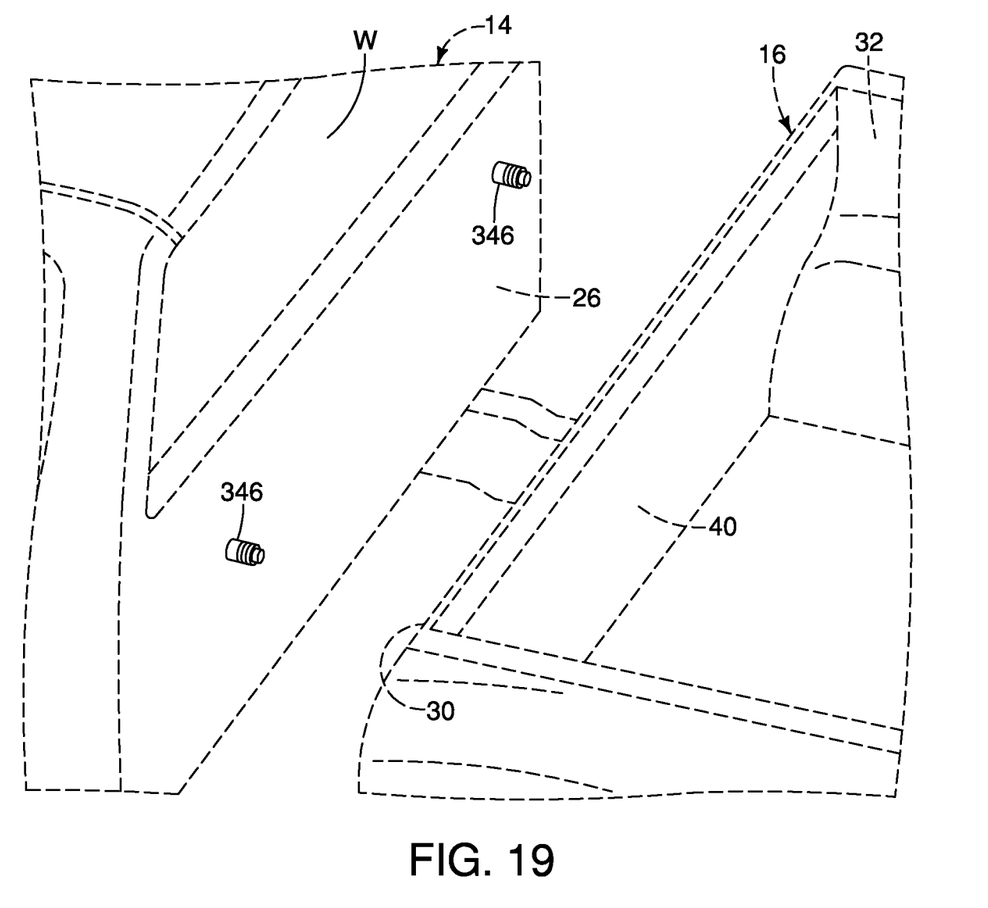
FIG. 19 is a perspective view of the cabin structure showing bumper elements attached to opposite end the rearward wall of the cabin structure in accordance with a fourth embodiment.

Referring now to FIG. 19, bumper elements 346 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the bumper elements 346 can be either of the bumper elements 46 of the first embodiment or the bumper elements 146 of the second embodiment but are installed to the rearward wall 26 of the cabin structure 14. The bumper elements 346 are installed below the window W of the cabin structure 14 and serve the same purpose as the bumper elements 46 of the first embodiment.

Fifth Embodiment

Figure 20:
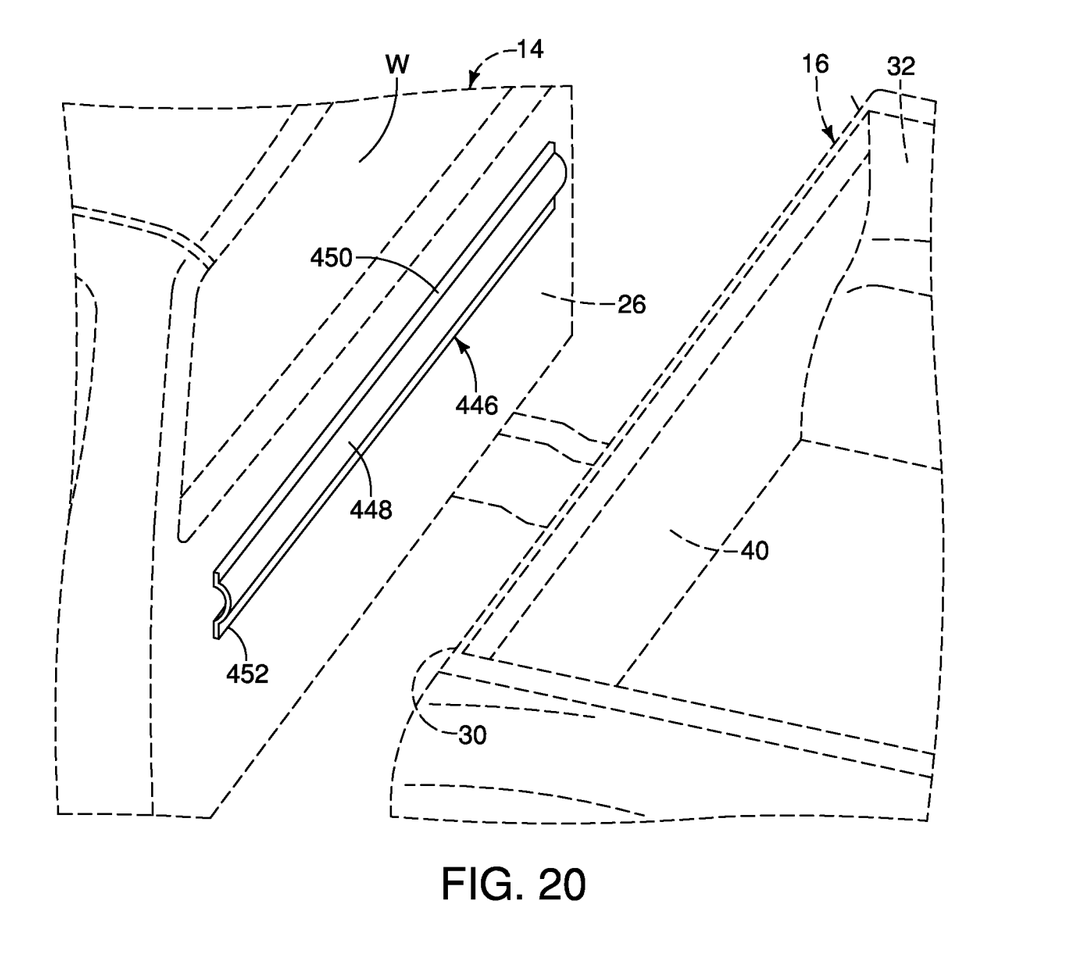
FIG. 20 is a perspective view of the cabin structure showing an elongated bumper element attached to the rearward wall of the cabin structure in accordance with a fifth embodiment.

Referring now to FIG. 20, an elongated bumper element 446 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, a single elongated bumper element 446 that is installed to the rearward wall 26 of the cabin structure 16 below the window W. The bumper element 446 extends from proximate a first lateral side to a second lateral side of the rear wall 26. The bumper element 446 is a single elongated elastic element that includes an upwardly extending lip 450 that is attached to the rearward wall below the window W. The single elongated elastic element 446 includes a downwardly extending lip 452 that is attached to the rearward wall 26 at a location below and spaced apart from the upwardly extending lip 450. The single elongated elastic element 446 includes a rearward facing surface having a curved or half cylindrical shape as viewed from a lateral side thereof in FIG. 20.

The vehicle body features and structures (other than the bumper elements) are conventional components that are well known in the art. Since these features and structures are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure, comprising:
    a vehicle frame structure;
    a cabin structure installed to a forward portion of the vehicle frame structure and defining a passenger compartment, the cabin structure having a rearward wall;
    a cargo area structure installed to a rearward portion of the vehicle frame structure, the cargo area structure having a forward wall spaced apart from the rearward wall of the cabin structure; and
    an elastic bumper element installed to one of the rearward wall or the forward wall such that in response to flexing of the vehicle frame structure, the elastic bumper element can contact the other of the rearward wall or the forward wall thereby restricting direct contact between the rearward wall and the forward wall, the elastic bumper element including two spaced apart bumper elements installed proximate opposite upper ends of the forward wall of the cargo area structure.

2. The vehicle body structure according to claim 1, wherein the elastic bumper elements are cylindrically shaped.

3. The vehicle body structure according to claim 1, wherein the elastic bumper elements have a tapered conical-like shape.

4. A vehicle body comprising:
a vehicle frame structure;
a cabin structure installed to a forward portion of the vehicle frame structure and defining a passenger compartment, the cabin structure having a rearward wall;
a cargo area structure installed to a rearward portion of the vehicle frame structure, the cargo area structure having a forward wall spaced apart from the rearward wall of the cabin structure; and
an elastic bumper element installed to one of the rearward wall or the forward wall such that in response to flexing of the vehicle frame structure, the elastic bumper element can contact the other of the rearward wall or the forward wall thereby restricting direct contact between the rearward wall and the forward wall, the elastic bumper element being a single elongated elastic element installed proximate an upper edge of a forward facing surface of the forward wall of the cargo area structure.

5. The vehicle body structure according to claim 4, wherein
the forward facing surface of the forward wall of the cargo area structure includes a recessed area, and
the single elongated elastic element includes a rearwardly extending lip that is attached to an upwardly facing surface of the recessed area.

6. The vehicle body structure according to claim 5, wherein
the single elongated elastic element includes a downwardly extending lip that is attached to the forward facing surface of the forward wall of the cargo area structure below the recessed area.

7. The vehicle body structure according to claim 6, wherein
the single elongated elastic element includes a forward facing surface having a half cylindrical shape as viewed from a lateral side thereof, the half cylindrical shape extending from the rearwardly extending lip to the downwardly extending lip.

8. The vehicle body structure according to claim 4, wherein
the single elongated elastic element includes a downwardly extending lip that is attached to the forward facing surface of the forward wall of the cargo area structure.

9. A vehicle body structure according to claim wherein comprising:
a vehicle frame structure;
a cabin structure installed to a forward portion of the vehicle frame structure and defining a passenger compartment, the cabin structure having a rearward wall;
a cargo area structure installed to a rearward portion of the vehicle frame structure, the cargo area structure having a forward wall spaced apart from the rearward wall of the cabin structure, the forward wall of the cargo area structure includes at least a main panel and a header panel that is attached to and extends along an upper area of the forward wall; and
an elastic bumper element installed to one of the rearward wall or the forward wall such that in response to flexing of the vehicle frame structure, the elastic bumper element can contact the other of the rearward wall or the forward wall thereby restricting direct contact between the rearward wall and the forward wall, the elastic bumper element includes two spaced apart bumper elements, and the header panel includes a pair of threaded openings proximate opposite lateral sides thereof, each of the pair of threaded openings being dimensioned to receive and retain corresponding ones of the two spaced apart bumper elements.

10. The vehicle body structure according to claim 9, wherein
the elastic bumper elements are cylindrically shaped.

11. The vehicle body structure according to claim 9, wherein the elastic bumper elements have a tapered conical-like shape.

12. The vehicle body structure according to claim 9, wherein
a rearward facing surface of the forward wall includes a utility track that is fixedly attached to the main panel of the forward wall of the cargo area structure.

* * * * *